United States Patent [19]

Schulz-Schlitte et al.

[11] Patent Number: 5,216,113
[45] Date of Patent: Jun. 1, 1993

[54] HIGHLY BRANCHED POLYPHOSPHONATES

[75] Inventors: Wolfgang-Hans Schulz-Schlitte, Dormagen; Jürgen Kirsch, Cologne; Karsten-Josef Idel, Krefeld; Gerd Fengler, Krefeld-Traa; Uwe Arndt, Cologne; Hans-Dieter Block, Leverkusen, all of Fed. Rep. of Germany

[73] Assignee: Bayer Aktiengesellschaft, Leverkusen, Fed. Rep. of Germany

[21] Appl. No.: 586,815

[22] Filed: Sep. 24, 1990

[30] Foreign Application Priority Data

Oct. 7, 1989 [DE] Fed. Rep. of Germany ....... 3933548

[51] Int. Cl.$^5$ ...................... C08G 8/02; C08G 79/02; C08G 75/00; C08G 63/02
[52] U.S. Cl. .................................. 528/167; 528/125; 528/171; 528/191; 528/193
[58] Field of Search ............... 528/125, 167, 193, 171, 528/191

[56] References Cited

U.S. PATENT DOCUMENTS

| | | |
|---|---|---|
| 2,716,101 | 8/1955 | Coover et al. |
| 4,350,793 | 9/1982 | Schmidt et al. ............ 525/905 |
| 4,374,971 | 2/1983 | Schmidt et al. |
| 4,781,984 | 11/1988 | Cavitt et al. ............ 525/533 |
| 4,970,249 | 11/1990 | Joswig et al. ............ 524/125 |

FOREIGN PATENT DOCUMENTS

| | | |
|---|---|---|
| 0008823 | 3/1980 | European Pat. Off. |
| 0021260 | 1/1981 | European Pat. Off. |
| 0028345 | 5/1981 | European Pat. Off. |
| 2323740 | 4/1977 | France |

Primary Examiner—John Kight, III
Assistant Examiner—T. Mosley
Attorney, Agent, or Firm—Connolly & Hutz

[57] ABSTRACT

The new polyphosphonates, which are highly branched through polyfunctional phosphorus compounds, are suitable for use as moldings, fibers or films and as flameproofing agents and stabilizers in plastics. The new highly branched polyphosphonates show high resistance to thermal ageing and ensure good processability coupled with high migration resistance at elevated in-use temperatures.

5 Claims, No Drawings

HIGHLY BRANCHED POLYPHOSPHONATES

This invention relates to new polyphosphonates highly branched through polyfunctional phosphorus compounds, to a process for the production of these polyphosphonates and to the use of the polyphosphonates for the production of moldings, fibers or films and as flameproofing agents and stabilizers in plastics.

Polyphosphonates are known (cf. DE 21 32 350, U.S. Pat. Nos. 3,830,771, 3,829,405, JP 47/39154, 48/01600, 50/062245, 50/034649, 51/11869, DE 30 02 550). The polyphosphonates described in the cited publications have a linear structure and are used inter alia as flame retardancy promoters in plastics.

EP 0 028 345 describes both linear aromatic polyphosphonates and also branched polyphosphonates and, in addition to trihydric and tetrahydric aromatic alcohols, mentions triallyl phosphates as branching agents. The disadvantage of the known polyphosphonates is that their thermal ageing resistance for example is inadequate. The known crosslinked polyphosphonates are attended by the disadvantage that a high concentration of crosslinking agent is necessary for obtaining adequate strength, good processability and high migration resistance at elevated in-use temperatures. This factor has an adverse effect, particularly where aromatic hydroxy compounds are used, because it reduces the effective phosphorus content in the polymer. Nor does the use of triaryl phosphates as cross-linking agents solve this problem because it is extremely difficult, on account of their low reactivity, to select the degree of branching in such a way that the resulting polyphosphonates are still readily processable (fusible) and, at the same time, have a sufficiently high molecular weight to retain their good processability.

Accordingly, the present invention relates to new, highly branched polyphosphonates based on A) 95 to 99.9% by weight and preferably 96 to 99.5% by weight structural units corresponding to the following formula

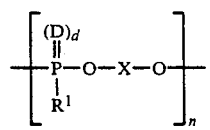

in which $R^1$ is an optionally substituted $C_{1-10}$ alkyl radical or an optionally substituted $C_{6-12}$ aromatic ring, D is sulfur or oxygen, preferably oxygen, d is 0 or 1, preferably 1, n is an integer of 2 to 1,000 and preferably 2 to 100 and X corresponds to the following formula

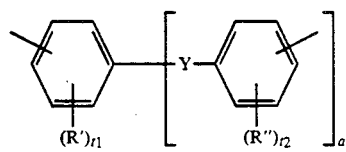

in which

Y is a single bond or $C_{1-3}$ alkylene, $C_{5-12}$ cycloalkylene or O, S, CO, $SO_2$, preferably $C_{1-3}$ alkylene, R' and R" independently of one another represent $C_{1-10}$ alkyl, halogen, phenyl or hydrogen, preferably hydrogen, a is 0 or 1, preferably 1, and $t_1$ and $t_2$ independently of one another represent 0, 1, 2, 3 or 4, preferably 0, or X is a naphthylene or phenolphthalein residue, and B) 0.1 to 5% by weight and preferably 0.5 to 4% by weight structural units corresponding to the following formulae

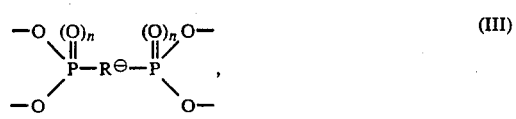

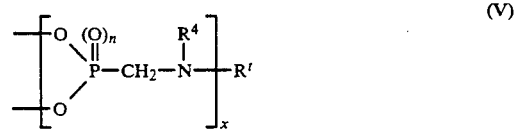

and/or

in which $R^4$ is hydrogen or an optionally substituted $C_{1-10}$ alkyl radical, preferably hydrogen, $R^e$ is a difunctional radical corresponding to the following formula

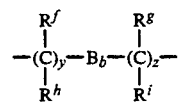

in which y and z independently of one another represent 0, 1, 2, 3, 4 or 5, preferably 1, b is 0 or 1, preferably 1, B represents O, S, $SO_2$, $NR^j$ and $R^f$, $R^g$, $R^h$, $R^i$ and $R^j$ represent hydrogen or optionally substituted $C_{1-6}$ alkyl or optionally substituted $C_{6-12}$ aryl, preferably hydrogen, $R^m$ is an oligomeric or polymeric group to which the phosphorus is attached like an ester either directly or optionally through a $C_{1-10}$ alkyl chain, the oligomeric or polymeric group being based on unsaturated organic compounds, such as acrylic acid, methacrylic acid, ethene, propene, butene, maleic acid, and contains up to 1,000 carbon atoms, preferably 100 carbon atoms, R$^t$ is the residue of an organic compound derived from optionally substituted amines, diamines, triamines, oligo- or polyamines and contains up to 1,000 carbon atoms, preferably 100 carbon atoms, q is an integer of greater than 2, preferably 3 and 4, n is 0 or 1, preferably 1, and x is an integer of 2 to 1,000 and preferably 2 to 100.

Preferred substituents R$^1$ are the methyl and ethyl radical and also the phenyl radical, the methyl radical being particularly preferred.

X represents an optionally substituted phenylene, bisphenylene, C$_{1-3}$ alkyl bisphenylene, C$_{5-12}$ cycloalkyl bisphenylene, sulfonyl bisphenylene, oxobisphenylene, thiobisphenylene, phenolphthalein, carbonylbisphenylene or naphthylene group, more preferably phenylene or C$_{1-3}$ alkyl bisphenylene. It is pointed out in this connection that the hydroxy compounds on which the difunctional groups X are based may be used in admixture with one another in the synthesis of the structural unit (I). In this case, the distribution of the structural elements (X) is statistical.

Suitable substituents for the groups R$^1$, R$^f$, R$^g$, R$^h$, R$^i$, R$^j$ and R$^4$ are —O—C$_{1-4}$ alkyl radicals, such as the methoxy, ethoxy and propoxy radical, and halogens, such as chlorine and bromine. In the case of R$^4$, the CH$_2$OH group is particularly suitable as a further substituent.

Preferred halogens in the above formulae are chlorine and bromine; preferred aryl radicals are phenyl radicals; and preferred groups R$^m$ is the oligoethene to polyethene (4 to 100 carbon atoms) and also the oligoacrylate to polyacrylate group (4 to 100 carbon atoms); and the preferred group R$^t$ is the oligo- to polyacrylamide group (4 to 100 carbon atoms) and also the melamine group.

Preferred highly branched polyphosphonates are based on

A) structural units corresponding to the following formulae

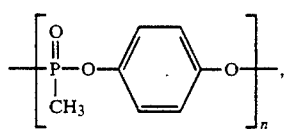 1)

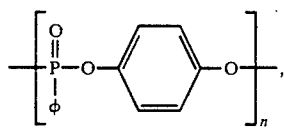

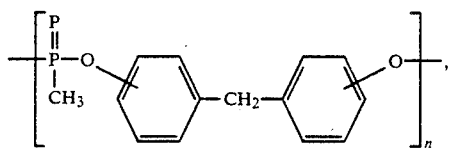 2)

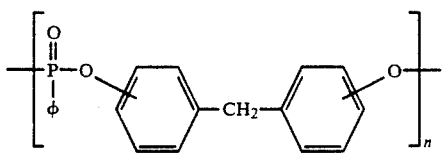 3)

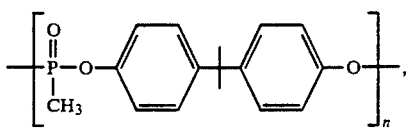

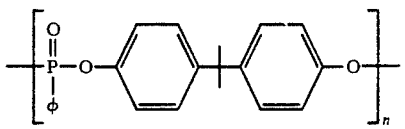

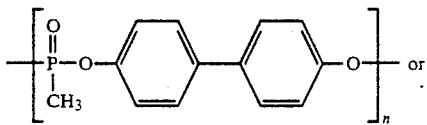 4)

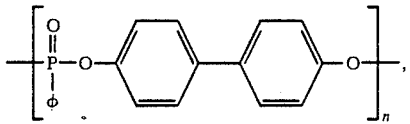 or in which n is as defined for formula (I), and

B) structural units corresponding to the following formulae

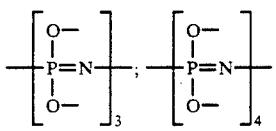 1)

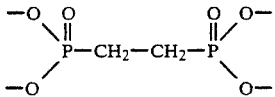 2)

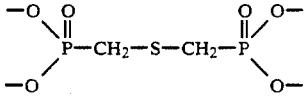

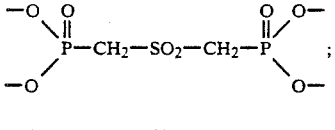

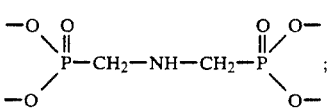

-continued
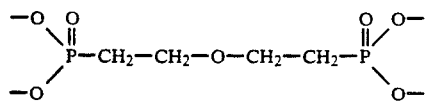
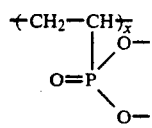
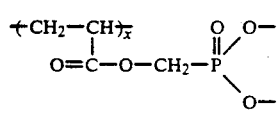
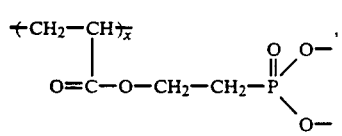
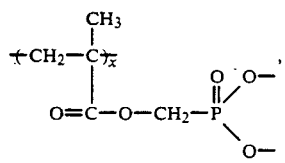
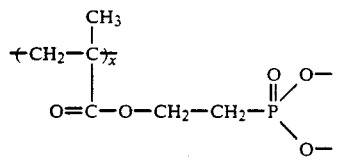
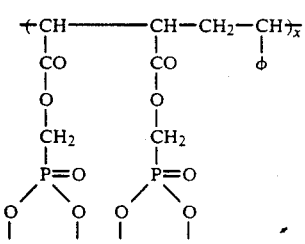
4)
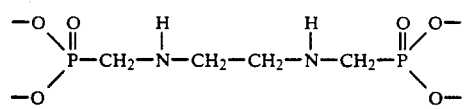
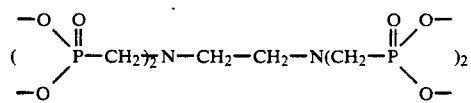
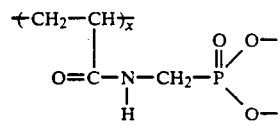
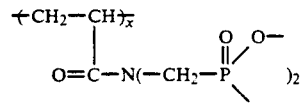
-continued
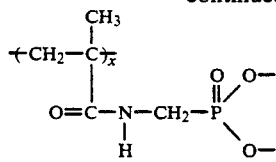
and/or
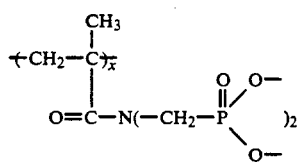
in which
x is as defined for formulae (IV) and (V), and also
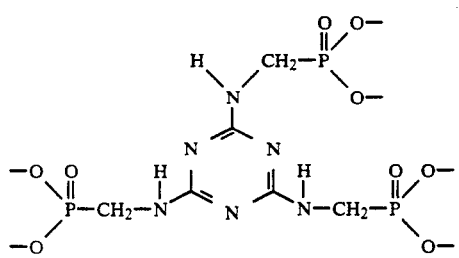
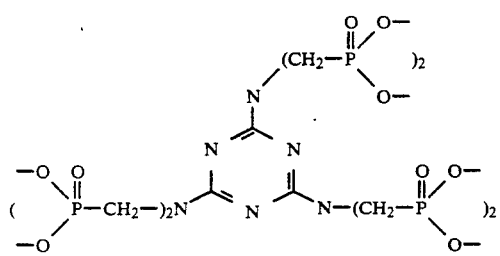
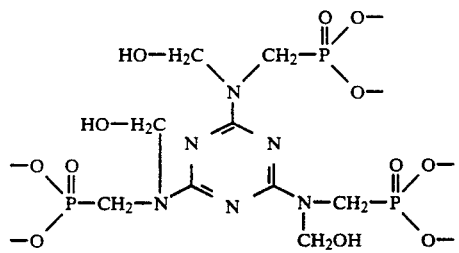
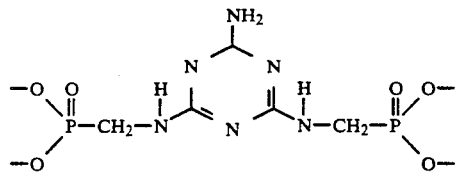
and/or
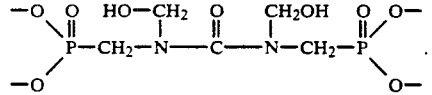
Particularly preferred highly branched polyphosphonates are based on A) structural units corresponding to the following formulae

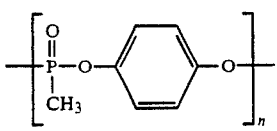

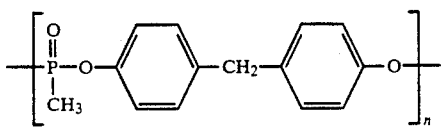

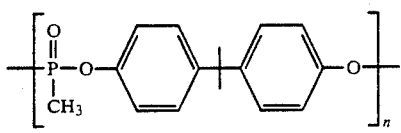

and/or

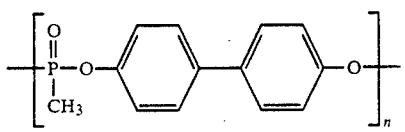

in which
n is as defined for formula (I) and (B) structural units corresponding to the following formulae 1) 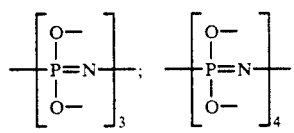

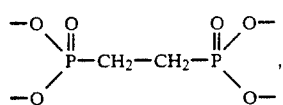

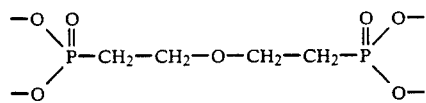

2) 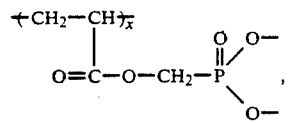

3) 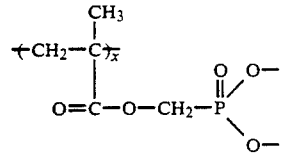

4) 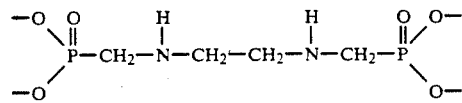

1) 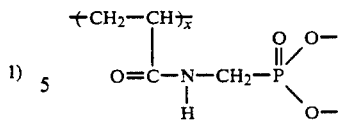

2) 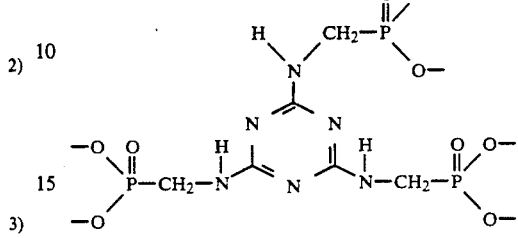

3) 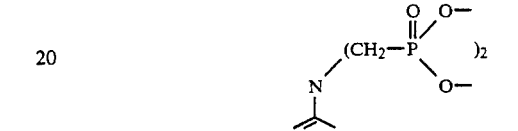

4) 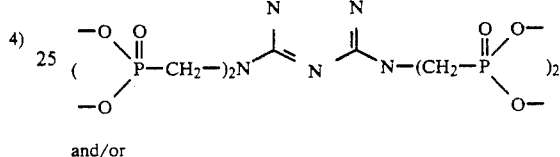

and/or

1) 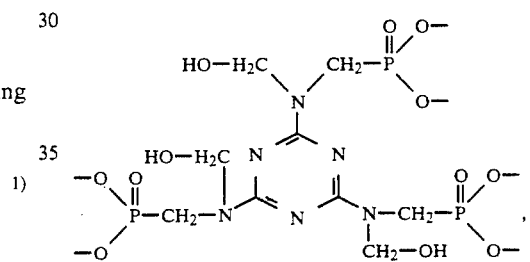

in which
X is as defined for formulae (IV) and (V).

The polyphosphonates based on the structural unit (I) (component A) are described, for example, in DE 38 33 694, DE 3 002 550, JA 47-39154, JA 48-01600, JA 50-062245, JA 50-034649, JA 51-111869.

The phosphorus compounds based on the structural units (II), (III), (IV), (V) and (VI) (component B) are described, for example, in Houben-Weyl, 4th Edition, Makromolekulare Stoffe, Part 3, 1987, pages 2210 et seq. and in copending German patent applications Le A 27 168 and Le A 27 222.

Compounds corresponding to general formula (III) may readily be obtained from the corresponding alkanediols and triphenyl phosphite in accordance with DE 21 67 077.

Compounds corresponding to general formula (IV) may be obtained by homo- or copolymerization of unsaturated phosphorus compounds, for example by polymerization of vinyl phosphonic acid ester, allyl phosphonic acid ester, methallyl phosphonic acid ester, or even by copolymerization of these P compounds with phosphorus-free unsaturated monomers, such as for example butadiene, acrylonitrile, acrylates or methacrylates, or by ester-like attachment of functional phosphorus compounds, such as for example hydroxymethane phosphonic acid ester or hydroxyethane phosphonic acid ester, to monomeric unsaturated compounds, such as for example acrylic acid, methacrylic acid or maleic acid, and subsequent polymerization or by ester-like attachment of the phosphorus compounds mentioned to polymers, for example to polyacrylate, polymethacrylate or polymaleate, or copolymers of these monomers with other unsaturated compounds.

Compounds corresponding to general formula (V) may readily be obtained from amines or amides, paraformaldehyde and triaryl phosphites in accordance with Le A 27 168 and Le A 27 222.

The structural units of components A) and B) are present in the polyphosphonate in the quantitative ratios mentioned above. The structural units of component B) may be present in admixture with one another in the highly branched polyphosphonates; the most favorable quantitative ratios may readily be determined by preliminary tests and are governed inter alia by the particular application envisaged.

The present invention also relates to a process for the production of the highly branched polyphosphonates by transesterification of at least one phosphonic acid ester and a polyfunctional phosphorus compound, which are based on the above-mentioned structural units (II) to (VI) of component B) and are referred to as so-called branching agents, with an aromatic dihydroxy compound in the melt in an oxygen-free gas atmosphere either at atmospheric pressure or under reduced pressure in the presence of catalytic quantities of a transesterification catalyst with removal of the volatile constituents by distillation.

The highly branched polyphosphonates may be produced with particular advantage in the presence of 0.5 to 5% by weight of an organic compound of anhydride or lactone structure, more especially phenolphthalein, based on the dihydroxy compound used. Suitable transesterification catalysts are sodium alcoholates, such as sodium phenolate or sodium methanolate, or at least one catalyst from the group consisting of $C_{1-18}$ tetraalkyl titanates, $C_{3-18}$ tetraalkyl zirconates, $C_{2-18}$ trialkyl vanadylates, $C_{2-4}$ dialkyl tin oxides, $C_{2-4}$-dialkyl tin compounds, zinc and calcium salts, particularly acetates thereof, a catalyst from the group consisting of antimony or bismuth salts, a catalyst from the group consisting of $C_{2-4}$ dialkyl tin acid esters, a catalyst from the group consisting of $C_{2-4}$ trialkyl tin acid esters or at least one of the catalysts from the groups mentioned above in admixture with germanium dioxide or titanium dioxide.

In principle, the new highly branched polyphosphonates may be produced as described in EP 0 028 345.

Suitable aromatic dihydroxy compounds are those corresponding to the following general formula

HO—X—OH          (VII)

in which

X is as defined for formula (I).

Aromatic dihydroxy compounds such as these are described, for example, in U.S. Pat. Nos. 3,028,365, 2,999,835, 3,148,172, 3,275,601, 2,991,273, 3,271,367, 3,062,781, 2,970,131 and 2,999,846; in DE-OSS 1 570 703, 2 063 050, 2 063 052, 2 211 095; in FR-PS 1 561 518 and in the book by H. Schnell entitled "Chemistry and physics of polycarbonates", Interscience Publishers, New York 1964.

The following aromatic dihydroxy compounds are mentioned in particular: hydroquinone, resorcinol, dihydroxydiphenyls, bis-(hydroxyphenyl)-alkanes, bis-(hydroxyphenyl)-cycloalkanes, bis-(hydroxyphenyl)-sulfides, bis-(hydroxyphenyl)-ethers, bis-(hydroxyphenyl)-ketones, bis-(hydroxyphenyl)-sulfones, bis-(hydroxyphenyl)-sulfoxides, α,α'-bis-(hydroxyphenyl)-diisopropyl benzenes and nucleus-alkylated and nucleus-halogenated compounds thereof.

Preferred aromatic dihydroxy compounds are 4,4'-dihydroxydi-(4-hydroxyphenyl)-propane,bis-(hydroxyphenyl)-methane, hydroquinone and bis-(4-hydroxyphenyl)-sulfone; particularly preferred aromatic dihydroxy compounds are hydroquinone, 2,2-bis-(4-hydroxyphenyl)-propane and bis-(hydroxyphenyl)-methane.

Suitable phosphonic acid esters are compounds corresponding to the following formulae

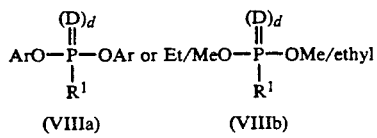

in which $R^1$, D and d are as defined for formula (I),

Ar represents an aryl radical, preferably phenyl, and

Et represents ethyl and Me represents methyl.

The diaryl phosphonic acid esters are, in particular, compounds corresponding to the following formulae:

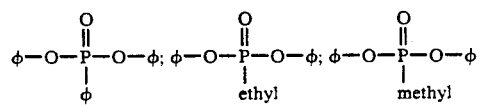

preferably

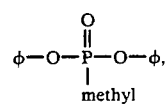

in which φ represents phenyl.

The so-called branching agents are polyfunctional phosphorus compounds corresponding to the following formula

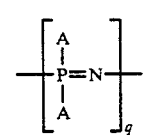         (IX)

in which

A is an optionally substituted $C_{6-18}$ and preferably $C_{6-12}$ O-aryl radical or halogen, preferably chlorine and bromine, and q is as defined for formula (II).

Suitable compounds of formula (IX) include, in particular,

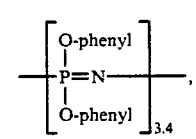

preferably the product Phosphazen P 3800 of Shin Nisso Kako, Japan.

Other suitable branching agents are compounds corresponding to the following formula $$\begin{array}{c} R^aO \\ \diagdown \\ R^bO \end{array} \overset{(O)_n}{\underset{\parallel}{P}} - R^e - \overset{(O)_n}{\underset{\parallel}{P}} \begin{array}{c} OR^c \\ \diagup \\ OR^d \end{array} \qquad (X)$$

in which $R^e$ and n are as defined for formula (III) and $R^a$, $R^b$, $R^c$ and $R^d$ are $C_6$ aryl radicals or methyl or ethyl radicals, preferably phenyl.

It is particularly preferred to use compounds corresponding to the following formula $$(PhO)_2-PO-CH_2-O-CH_2-PO-(OPh)_2 \qquad (Xa)$$

and compounds corresponding to the following formula $$(PhO)_2-PO-CH_2-CH_2-PO-(OPh)_2 \qquad (Xb).$$

In addition, compounds corresponding to the following formula $$\left[ \begin{array}{c} R^kO \\ \diagdown \\ R^lO \end{array} \overset{(O)_n}{\underset{\parallel}{P}} - R^m \right]_x \qquad (XI)$$

in which $R^m$ and x are as defined for formula (IV) and $R^k$ and $R^l$ represent a $C_{6-12}$ aryl radical or methyl or ethyl radicals, preferably the phenyl radical, may be used as branching agents.

Compounds of the type corresponding to formulae (XIb) and (XIb)

$$\begin{array}{c} \leftarrow CH_2-CH \rightarrow_{\overline{x}} \\ | \\ O=C-O-CH_2-\overset{O}{\underset{\parallel}{P}} \begin{array}{c} O\text{-Phenyl} \\ \diagup \\ O\text{-Phenyl} \end{array} \end{array} \quad \text{and} \qquad (XIa)$$

$$\begin{array}{c} CH_3 \\ | \\ \leftarrow CH_2-C \rightarrow_{\overline{x}} \\ | \\ O=C-O-CH_2-\overset{O}{\underset{\parallel}{P}} \begin{array}{c} O\text{-Phenyl} \\ \diagup \\ O\text{-Phenyl} \end{array} \end{array} \qquad (XIb)$$

in which $x \geq 2$, preferably 2 to 100, are preferably used.

Other suitable branching agents are compounds corresponding to the following formula $$\left[ \begin{array}{c} R^tO \\ \diagdown \\ R^sO \end{array} \overset{(O)_n}{\underset{\parallel}{P}} - CH_2 - \overset{R^u}{\underset{|}{N}} - R^t, \right]_x \qquad (XIII)$$

in which $R^t$, x and n are as defined for formula (V) and $R^u$ is hydrogen or an aliphatic, cycloaliphatic or aromatic $C_{1-12}$ and preferably $C_{1-6}$ radical and $R^r$ and $R^s$ represent a $C_{6-10}$ aryl radical or a methyl or ethyl radical, preferably phenyl.

Preferred compounds correspond to the following formula $$\begin{array}{c}
R^5 \\
\diagdown \\
R^6
\end{array} N - \underset{N}{\overset{N}{\diagdown}} \underset{\diagup}{\overset{N}{\diagdown}} \begin{array}{c} R^1 \\ \diagup \\ N \\ \diagdown R^2 \end{array} \\
N = \begin{array}{c} \diagup R^3 \\ \diagdown R^4 \end{array}
\qquad (XIIIa)$$

in which $R^1$ to $R^6$ independently of one another represent hydrogen, $C_{1-6}$ alkyl or hydroxyalkyl or $CH_2-P=O(O\text{-phenyl})_2$, with the proviso that at least three of the substituents $R^1$ to $R^6$ are $CH_2-P=O(O\text{-phenyl})_2$.

Particularly preferred compounds correspond to the following formulae $$\begin{array}{c}
(PhO)_2\overset{O}{\underset{\parallel}{P}} \diagdown NH - \underset{N}{\overset{N}{\diagdown}} \underset{\diagup}{\overset{N}{\diagdown}} \begin{array}{c} H \quad O \\ N \diagdown \underset{\parallel}{\overset{}{P}}(OPh)_2 \\ N \end{array} \\
N = \underset{H}{\overset{N}{\diagdown}} \underset{\parallel}{\overset{O}{\diagdown}} P(OPh)_2
\end{array} \quad \text{and} \qquad (XIIIb)$$

$$\begin{array}{c}
HO-CH_2 \diagdown \underset{N}{\overset{}{\diagup}} \underset{N}{\overset{CH_2-\overset{O}{\underset{\parallel}{P}} \begin{array}{c} O\text{-Phenyl} \\ \diagup \\ O\text{-Phenyl} \end{array}}{}} \\
HO-CH_2 \diagdown \underset{N}{\overset{}{\diagup}} \underset{N}{\overset{CH_2-\overset{O}{\underset{\parallel}{P}} \begin{array}{c} O\text{-Phenyl} \\ \diagup \\ O\text{-Phenyl} \end{array}}{}} \\
Phenyl-O \diagdown \underset{\parallel}{\overset{}{P}}-CH_2 \quad CH_2OH \\
Phenyl-O \quad O
\end{array} \qquad (XIIIc)$$

In addition, compounds corresponding to the following formula $$\begin{array}{c} OR^r \\ \diagup \\ P-OR^s \\ \diagdown \\ OR^q \end{array} \qquad (XIV)$$

in which $R^r$, $R^s$ and $R^q$ represent $C_{6-12}$ aryl radicals or methyl or ethyl radicals, preferably the phenyl radical, may also be used as phosphorus-containing branching agents.

p-Methyl triphenyl phosphite, o-methyl triphenyl phosphite and triphenyl phosphite are mentioned as examples of compounds corresponding to formula (XIV), triphenyl phosphite being preferred.

The above-mentioned components (B), which are used for the synthesis of the new, highly branched polyphosphonates, are used in quantities which correspond to the above-mentioned quantities of the structural units (II) to (VI) on which the polyphosphonates are based.

The highly branched polyphosphonates according to the invention may also be additionally branched through the alcohol component with small quantities (>2 mol-%) of polyfunctional hydroxy compounds, including the known trifunctional and tetrafunctional hydroxy derivatives, such as 4,6-dimethyl-2,4,6-tri-(4-hydroxyphenyl)-heptane; 1,3,5-tri-(4-hydroxyphenyl)-benzene and 1,4-bis-(4,4,-dihydroxytriphenylmethyl)-benzene, trifunctional or tetrafunctional carboxylic acid aryl esters, such as trimesic acid triaryl ester and pyromellitic acid tetraphenyl ester. Preferred hydroxy branching agents are trihydroxybenzene or tris-1,3,5-[(4-hydroxy-2-phenylene-2-propylenes)](cf. for example DE 3 833 694).

In addition, the new highly branched polyphosphonates may be additionally branched with up to 1 mol-% triphenyl phosphate.

The polyphosphonates have an insoluble component of $\geq 5\%$ by weight, preferably $\geq 30\%$ by weight, more preferably $\geq 60\%$ by weight and most preferably $\geq 80\%$ by weight. The insoluble component in the polyphosphonates is determined by way of their gelable component (method in the following Examples) and is a measure of the degree of branching.

Branching agents corresponding to the following formulae

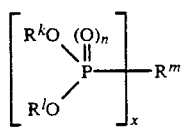
(XI)

and

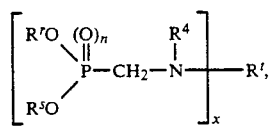
(XIII)

in which $R^k$, $R^l$, $R^m$, $R^r$, $R^s$, $R^t$, $R^4$ are as defined above, are particularly preferred for the production of the polyphosphonates according to the invention, branching agents corresponding to the following formulae

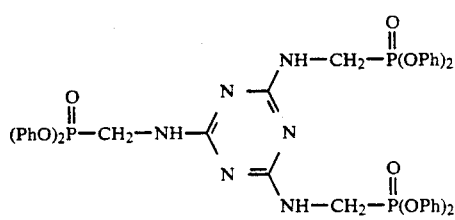

and/or

-continued $$\begin{array}{c} \text{OH} \\ | \\ \text{CH}_2 \\ | \\ \text{N—CH}_2\text{—P(OPh)}_2 \\ \parallel \\ \text{O} \end{array}$$

(with the full triazine structure as shown)

being most particularly preferred.

The highly branched polyphosphonates according to the invention may be incorporated as additives in plastics (thermoplastics and thermosets). They show a greatly improved flameproofing effect by comparison with known polyphosphonates. In addition, the incorporation of the polyphosphonates in the plastics is also improved (see Comparison Examples). In addition, the polyphosphonates according to the invention may be incorporated in plastics as stabilizers having excellent migration properties.

The polyphosphonates according to the invention may be incorporated in the plastics, optionally with known reinforcing materials and processing aids, in typical mixing units, such as mixing rolls, kneaders, single-screw and multiscrew extruders. The polyphosphonates according to the invention may also be directly added to the plastics in the form of a physical mixture, for example by conventional injection molding processes, without any need for preliminary compounding in the melt.

In other respects, the polyphosphonates according to the invention are blended with plastics by known methods (cf. DE 3 733 840/German patent application P 38 33 694.4/DE 3 342 414).

The highly branched polyphosphonates according to the invention may also be directly used for the production of thermoplastic moldings, films or fibers.

EXAMPLES

I. Synthesis of a Few Selected Polyphosphonates (POP)

Hydroquinone-POP containing 1 mol-% 2,4,6-tris-(aminomethylphosphono)-1,3,5-triazine hexaphenyl ester (branching agent A):

2310 g (21 mol) hydroquinone 5260 g (21.2 mol) methanephosphonic acid diphenyl ester 21 g (1 g/mol dihydroxy compound used) sodium phenolate 180 g (210 mmol) branching agent A 66 g (210 mmol) phenolphthalein are intensively mixed under nitrogen for 30 minutes at 240° C. in a flask. The reaction mixture is heated to 320° C. over a period of 1 hour under a vacuum of 500 mbar. The pressure is then reduced to $\leq 1.3$ mbar and the transesterification reaction is continued for 3 hours with removal of the phenol released by distillation, the viscosity of the melt increasing. After venting with nitrogen, the polymer is allowed to settle with the stirrer switched off and 3.1 kg polyphosphonate are obtained by spinning off under pressure and granulation of the melt strand. Gel content: 72% (for definition, see point II)

Hydroquinone-POP containing 5 mol-% triphenyl phosphite: Phosphonate as above
  Branching agent: 325.4 g (1 mol triphenyl phosphite)
  Procedure as above
  Yield: 3.2 kg
  Gel content: 82%

Hydroquinone-POP containing 1.125 mol-% Phosphazen P 3800 (Shin Nisso Kako, Japan):
  Phosphonate as above
  Branching agent: 182 g (230 mmol) Phosphazen P 3800
  Procedure as above
  Yield: 3.0 kg
  Gel content: 10%

Hydroquinone-POP containing 3 mol-% (PhO)$_2$—PO—CH$_2$—CH$_2$—PO—(OPh)$_2$:
  Phosphonate as above
  Branching agent: 261 g (530 mmol) (PhO)$_2$—PO—CH$_2$—CH$_2$—PO(OPh)$_2$:
  Procedure as above
  Yield: 2.9 kg
  Gel content: 15%

Bisphenol-F-POP containing 1 mol-% branching agent A:
  4200 g (21 mol) bisphenol F
  5260 g (21.2 mol) methanephosphonic acid diphenyl ester
  504 mg (24 mg/mol dihydroxy compound used) zinc acetate
  108 g (210 mmol) branching agent A
  66 g (210 mmol) phenolphthalein
are intensively mixed under nitrogen for 30 minutes at 240° C. in a flask. The reaction mixture is heated to 320° C. over a period of 1 hour under a vacuum of 500 mbar. The pressure is then reduced to ≦1.3 mbar and the transesterification reaction is continued for 3 hours with removal of the phenol released by distillation, the viscosity of the melt increasing. After venting with nitrogen, the polymer is allowed to settle with the stirrer switched off and 4.4 kg polyphosphonate are obtained by spinning off under pressure and granulating the melt strand. Gel content: 78%

Bisohenol-F-POP containing 1 mol-% branching agent A and 1 mol-% tris-1,3,5-[(4-hydroxy-2-phenylene-2-propylidene)benzene] (branching agent B):
  Phosphonate as above
  Branching agent:
    180 g (210 mmol) branching agent A
    100 g (210 mmol) branching agent B
  Procedure as above
  Yield: 4.3 kg
  Gel content: 95%

Dihydroxydiphenyl-POP containing 0.75 mol-% Phosphazen P 3800 (Shin Nisso Kako, Japan):
  I. 1300 g (7 mol) dihydroxydiphenyl
    1754 g (7.07 mol) methanephosphonic acid diphenyl ester
    238 mg (17 mg/mol dihydroxy compound used) sodium phenolate
    41 g (50 mmol) phosphazen p 3800 (Shin Nisso kako, Japan)
  II. 120 g (4 mol-%) diphenyl carbonate The substances under I. are intensively mixed under nitrogen in a flask at 275° C. After 2 hours, the reaction mixture is heated to 300° C. under a vacuum of 100 mbar. The vacuum is then reduced to ≦1.3 mbar over a period of 30 to 45 minutes and the transesterification reaction is continued for 30 minutes with removal of the phenol released by distillation. II. is then added and, after stirring for 15 minutes at 500 mbar, the air pressure is again reduced to below 1.2 mbar. In order to complete the condensation reaction, the melt is heated for 3 hours at 320° C. After venting with nitrogen, the polymer is allowed to settle with the stirrer switched off and 1.7 kg polyphosphonate are obtained by spinning off under pressure and granulation of the melt strand. Gel content: 15%

Dihydroxydiphenyl hydroquinone-POP (1:2) containing 1 mol-% branching agent A:
  I. 1300 g (7 mol) dihydroxydiphenyl
    1540 g (14 mol) hydroquinone
    5260 g (212 mol) methane phosphonic acid diphenyl ester
    357 g (17 mg/mol dihydroxy compound used) sodium phenolate
    180 g (210 mmol) branching agent A
  II. 180 g (0.8 mol) diphenyl carbonate The substances under I. are intensively mixed under nitrogen in a flask at 275° C. After 2 hours, the reaction mixture is heated to 300° C. under a vacuum of 100 mbar. The vacuum is then reduced to ≦1.3 mbar over a period of 30 to 45 minutes and the transesterification reaction is continued for 30 minutes with removal of the phenol released by distillation. II. is then added and, after stirring for 15 minutes at 500 mbar, the air pressure is again reduced to below 1.2 mbar. In order to complete the condensation reaction, the melt is heated for 3 hours at 320° C. After venting with nitrogen, the polymer is allowed to settle with the stirrer switched off and 2.5 kg polyphosphonate are obtained by spinning off under pressure and granulation of the melt strand. Gel content: 83%

II. Production, Processing and Testing of the Components

All the thermoplastic polymers are used in the form of granulate. The components used are melted, mixed and extruded to strands in a twin-screw extruder and then granulated. The molding compounds may be produced, for example, using a Werner & Pfleiderer ZSK 32 extruder under typical processing conditions (screw speed 80 to 130 r.p.m., throughput 8 to 14 kg/h).

After adequate drying (for example 3 to 4 hours at 120° C.), the granulate is processed to moldings or standard test specimens in typical injection molding machines at melt temperatures of 230° C. to 320° C., mold temperatures of 80° to 130° C. and a dwell time in the melt phase of no longer than 9 minutes.

Flame retardancy is tested in accordance with the guidelines of the Underwriters' Laboratories (UL-94-Test). The results are shown in the following Tables. The quantities in which the components are used are shown in parts by weight.

The degree of branching of the polyphosphonates is determined by determination of the gel component. To this end, 1.0 g ground polyphosphonate (particle size less than 1 mm) is introduced into 50 ml freshly distilled, alcohol-free dichloromethane. After 5 minutes' ultrasonication at a bath temperature of 21° to 28° C. (Bransonic ®B-2000 E4, rated HF output: 60 watts), the product is filtered at room temperature and the dissolved phosphonate component is determined after removal of the solvent by distillation.

The glass temperatures of the phosphonates were determined using commercially available DSC instruments.

Table 1 shows that the glass temperature of the polyphosphonates can be considerably increased by branching so that their plasticizing properties in plastics, for example polyalkylene terephthalates, are reduced accordingly.

TABLE 1

| Glass temperatures of an unbranched polyphosphonate (1), a conventionally branched polyphosphonate (2) and a polyphosphonate branched in accordance with the invention (3): | $T_G$ |
|---|---|
| Hydroquinone phosphonate (1) (unbranched) | approx. 60° C. |
| Hydroquinone phosphonate containing 1 mol % branching agent B (2) | approx. 60° C. |
| Hydroquinone phosphonate containing 1 mol % branching agent A and 1 mol % branching agent B (3) | approx. 70° C. |

Table 2 below shows a few selected Examples according to the invention (1, 2, 3, 6) by comparison with the prior art (Examples 4, 5). Thus, it can be seen that the processing behavior of the hydroquinone phosphonate (Hu-POP) can be distinctly improved by branching whereas, in the case of the dihydroxydiphenyl phosphonates (DOD-POP), burning behavior can be improved by one UL class (layer thickness 0.8 mm) by the branching agent.

TABLE 2

| Example | 1 | 2 | 3 | 4 Comp. | 5 Comp. | 6 |
|---|---|---|---|---|---|---|
| PET (%) | 54.4 | 54.4 | 54.4 | 54.4 | 54.4 | 54.4 |
| Typical** additives (%) | 2.6 | 2.6 | 2.6 | 2.6 | 2.6 | 2.6 |
| Hy-POP (A) (%) | 12.5 | — | — | — | — | — |
| Hy-POP (B) (%) | — | 12.5 | — | — | — | — |
| Hy-POP (C) (%) | — | — | 12.5 | — | — | — |
| Hy-DOD-POP (%) | — | — | — | 12.5 | — | — |
| DOD-POP (A) (%) | — | — | — | — | 12.5 | — |
| DOD-POP (B) (%) | — | — | — | — | — | 12.5 |
| Glass fibers (%) | 30.0 | 30.0 | 30.0 | 30.0 | 30.0 | 30.0 |
| PTFE (%) | 0.5 | 0.5 | 0.5 | 0.5 | 0.5 | 0.5 |
| UL-94 (0.8 mm) 2d/7d | V O | V O | V O | *) | V 1 | V O |
| UL-94 (1.6 mm) 2d/7d | V O | V O | V O | *) | V O | V O |

*)non-compoundable in our own tests
**the following additives are used: 0.5 g PE-Wachs (PE wax) 52 g, a product of Hoechst; 0.1% Stabaxol, a product of Rhein-Chemie and 2% MVR Microtalkum, a product of Mistron Mineralien, Wildberg
Hy-POP (A): 1.125 mol % Phosphazen P 3800 (Shin Nisso Kako, Japan)
Hy-POP (B): 1 mol % 2,4,6-tris-(aminomethylphosphono)-1,3,5-triazine hexaphenyl ester (branching agent A)
Hy-POP (C): unbranched
Hy-DOD-POP: 1.125 mol % Phosphazen P 3800 (Shin Nisso Kako, Japan)
DOD-POP (A): 1 mol tris-1,3,5-(4-hydroxy-2-phenylene-2-propylidene)-benzene] (branching agent B/comparison branching agent)
DOD-POP (B): 1.125 mol % Phosphazen P 3800 (Shin Nisso Kako, Japan)
Components used in Table 2
1. Polyethylene terephthalate, intrinsic viscosity 0.72 dl/g, as measured in a mixture of phenol and o-dichlo-robenzene (ratio by weight 1:1) at 25° C. in an Ubbelohde viscosimeter (PET)
2. PTFE (Hostaflon ® TF 2027, a product of Hoechst AG)
3. Commercially available glass fibers.

We claim:

1. Highly branched polyphosphonate comprising
A) 95 to 99.9% by weight of structural units $$\left[ \begin{array}{c} (D)_d \\ \| \\ -P-O-X-O- \\ | \\ R^1 \end{array} \right]_n$$

in which $R^1$ is $C_{1-10}$ alkyl or $C_{6-12}$ aromatic ring, each unsubstituted or substituted by $-OC_1-C_4$ alkyl or halogen, D is sulfur or oxygen, d is 0 or 1, n is an integer of 2 to 1,000 and X corresponds to <chemical structure showing two phenyl rings connected by Y, with (R')_{t1} and (R'')_{t2} substituents, enclosed in brackets with subscript a> in which

Y is a single bond or Y is $C_{1-3}$ alkylene, $C_{5-12}$ cycloalkylene or O, S, CO, SO$_2$, R' and R'' independently of one another represent $C_{1-10}$ alkyl, halogen, phenyl or hydrogen, a is 0 to 1, and $t_1$ and $t_2$ independently of one another represent 0, 1, 2, 3 or 4 or X is a naphthylene or phenolphthalein residue, and B) 0.1 to 5% by weight structural units corresponding to at least one of (II) through (VI) as follows:

$$\left[ \begin{array}{c} O- \\ | \\ -P=N- \\ | \\ O- \end{array} \right]_q \quad (II)$$

$$\begin{array}{c} -O \quad (O)_n \quad (O)_n \quad O- \\ \diagdown \| \quad \| \diagup \\ P-R^\ominus-P \\ \diagup \quad \diagdown \\ -O \quad\quad\quad O- \end{array} \quad (III)$$

$$\left[ \begin{array}{c} -O \quad (O)_n \\ \diagdown \| \\ P-R^m \\ \diagup \\ -O \end{array} \right]_x \quad (IV)$$

$$\left[ \begin{array}{c} -O \quad (O)_n \quad R^4 \\ \diagdown \| \quad | \\ P-CH_2-N-R^t \\ \diagup \\ -O \end{array} \right]_x \quad (V)$$

and/or $$\begin{array}{c} O- \\ \diagup \\ P-O- \\ \diagdown \\ O- \end{array} \quad (VI)$$

in which $R^4$ is hydrogen or $C_{1-10}$ alkyl which is unsubstituted or substituted by $-O-CH_{1-4}$ alkyl, hydrogen or $-CH_2OH$, $R^e$ is a difunctional group corresponding to

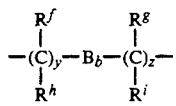

in which y and z independently of one another represent 0, 1, 2, 3, 4 or 5, b is 0 or 1, B represents O, S, SO$_2$ or NR$^j$ and R$^f$, R$^g$, R$^h$, R$^i$ and R$^j$ represent hydrogen, C$_{1-6}$ alkyl or C$_{6-12}$ aryl, wherein the alkyl or aryl is unsubstituted or substituted by $-O-C_{1-4}$ alkyl or halogen, R$^m$ is an oligomeric or polymeric group to which the phosphorus is bonded either directly or through a C$_{1-10}$ alkyl chain, the oligomeric or polymeric group being based on unsaturated organic compounds and contains up to 1,000 carbon atoms, R$^t$ is the residue of an organic compound derived from amines, diamines, triamines, oligo- or polyamines and contains up to 1,000 carbon atoms, q is an integer of greater than 2, n is 0 or 1, x is an integer of 2 to 1,000.

2. A thermoplastic or thermoset molding composition containing the highly branched polyphosphonate according to claim 1 as a flameproofing additive.

3. A thermoplastic or thermoset molded article shaped from the composition claimed in claim 2.

4. Highly branched polyphosphonate as claimed in claim 1 comprising 96 to 99.5% by weight of component A) and 0.5 to 4% by weight of component B).

5. A process for the production of the highly branched polyphosphonate claimed in claim 1 wherein at least one phosphonic acid ester and a polyfunctional phosphorus compound which are based on the structural units (II) to (VI) of component B are transesterified with an aromatic dihydroxy compound in the melt in an oxygen-free gas atmosphere at atmospheric pressure or under reduced pressure in the presence of catalytic quantities of a transesterification catalyst with removal of the volatile constituents by distillation.

* * * * *